United States Patent
Nagasaka et al.

(10) Patent No.: US 7,331,102 B2
(45) Date of Patent: Feb. 19, 2008

(54) APPARATUS FOR DETECTING AN AMOUNT OF STRAIN AND METHOD FOR MANUFACTURING SAME

(75) Inventors: Hiroshi Nagasaka, Ohta-ku (JP); Naoki Yoshida, Ohta-ku (JP); Hiroshi Kodama, Ohta-ku (JP)

(73) Assignee: Nagano Keiki Co., Ltd., Tokyo (JP)

( * ) Notice: Subject to any disclaimer, the term of this patent is extended or adjusted under 35 U.S.C. 154(b) by 263 days.

(21) Appl. No.: 11/298,527

(22) Filed: Dec. 12, 2005

(65) Prior Publication Data
US 2006/0099821 A1 May 11, 2006

Related U.S. Application Data

(62) Division of application No. 10/669,321, filed on Sep. 25, 2003, now abandoned.

(30) Foreign Application Priority Data
Sep. 30, 2002 (JP) .............. P2002-287881

(51) Int. Cl.
*H01C 17/06* (2006.01)
*H01C 17/28* (2006.01)

(52) U.S. Cl. .................. 29/620; 29/620.1
(58) Field of Classification Search ........... None
See application file for complete search history.

(56) References Cited

U.S. PATENT DOCUMENTS

| | | | |
|---|---|---|---|
| 4,319,397 A | | 3/1982 | Tanabe et al. |
| 4,984,046 A | | 1/1991 | Graeger et al. |
| 5,167,158 A | * | 12/1992 | Kamachi et al. .......... 73/727 |
| 5,191,798 A | * | 3/1993 | Tabata et al. ............ 73/727 |
| 5,326,726 A | * | 7/1994 | Tsang et al. ........... 438/52 |
| 5,417,111 A | * | 5/1995 | Sherman et al. ........ 73/514.32 |
| 5,539,158 A | | 7/1996 | Utsunomiya et al. |
| 5,622,901 A | * | 4/1997 | Fukada ................ 438/50 |
| 6,406,570 B1 | * | 6/2002 | Tellenbach ............ 148/608 |
| 6,409,845 B1 | * | 6/2002 | Tellenbach ............ 148/325 |
| 6,427,539 B1 | * | 8/2002 | Chen et al. ............ 73/726 |
| 6,490,934 B2 | | 12/2002 | Garshelis |
| 6,495,389 B2 | | 12/2002 | Ishio et al. |
| 6,544,354 B1 | | 4/2003 | Kawano et al. |
| 6,546,806 B1 | * | 4/2003 | Varma ................ 73/775 |
| 6,622,558 B2 | | 9/2003 | Huff et al. |
| 6,650,102 B2 | * | 11/2003 | Hajduk et al. .......... 324/76.49 |
| 6,684,487 B2 | | 2/2004 | Naito et al. |

(Continued)

FOREIGN PATENT DOCUMENTS

EP 0174553 3/1986

(Continued)

*Primary Examiner*—David E Graybill
(74) *Attorney, Agent, or Firm*—Steptoe & Johnson LLP

(57) ABSTRACT

An apparatus for detecting an amount of strain comprises a strain generating part, an electrical insulating layer and sensing elements. The strain generating part is a member to which strain is to be applied. The electrical insulating layer is formed on the strain generating part. The sensing elements are formed on the electrical insulating layer. Each of the sensing elements is made of a silicon film. The silicon film comprises a poly-crystalline main layer and a poly-crystalline interface-layer, which comes into contact with the electrical insulating layer.

3 Claims, 4 Drawing Sheets

U.S. PATENT DOCUMENTS

| | | |
|---|---|---|
| 6,690,179 B2 * | 2/2004 | Hajduk et al. ............... 324/663 |
| 6,729,187 B1 | 5/2004 | Gregory |
| 6,732,583 B1 | 5/2004 | Yasuda et al. |
| 6,755,919 B2 | 6/2004 | Toyooka et al. |
| 6,772,642 B2 * | 8/2004 | Hajduk et al. ................ 73/819 |
| 2003/0041671 A1 * | 3/2003 | Hajduk et al. ................ 73/800 |
| 2003/0041672 A1 * | 3/2003 | Hajduk et al. ................ 73/800 |
| 2003/0041676 A1 * | 3/2003 | Hajduk et al. ......... 73/862.041 |
| 2003/0102058 A1 | 6/2003 | Ishikawa et al. |

FOREIGN PATENT DOCUMENTS

| | | |
|---|---|---|
| JP | 61-070716 | 4/1986 |
| JP | 01-173846 | 7/1989 |
| JP | 02-215166 | 8/1990 |
| JP | 03-233975 | 10/1991 |
| JP | 2001-279385 | 10/2001 |

* cited by examiner

APPARATUS FOR DETECTING AN AMOUNT OF STRAIN AND METHOD FOR MANUFACTURING SAME

This application is a divisional of application Ser. No. 10/669,321 filed Sep. 21, 2003.

BACKGROUND OF THE INVENTION

1. Field of the Invention

The present invention relates to an apparatus for detecting an amount of strain, which is to be applied to measurement of pressure of fluid such as gas or liquid, and to a method for manufacturing such an apparatus.

2. Description of the Related Art

With respect to fabrication of sensing elements in the conventional strain detecting apparatus, there exists a technique to form poly-crystalline silicon films (strain gages) on a substrate sheet utilizing a plasma CVD method, as described in Japanese Patent Publication No. H6-70969.

In the conventional strain detecting apparatus fabricated utilizing the above-mentioned method, an electrical insulating layer 31 (i.e., a silicon oxide film) is formed on a diaphragm-main body 30, which has a cavity 30a into which fluid to be subjected to a pressure measurement is to be introduced, and then, the poly-crystalline silicon films are formed on the electrical insulating layer 31 so as to serve as the strain gages 32, as shown in FIG. 7.

More specifically, in such a strain detecting apparatus, the poly-crystalline silicon film is formed at a temperature of up to 590° C. utilizing the plasma CVD method. Such a poly-crystalline silicon film is subjected to a process such as photolithography to provide the strain gages 32 having an appropriate shape.

Such strain gages 32 are advantageous in manufacturing the poly-crystalline silicon films in large quantities and at low cost. The strain gage 32 has appropriate temperature characteristics for the strain gage, i.e., TCR (temperature coefficient of resistance) of from −700 ppm/° C. to −200 ppm/° C. and TCS (temperature coefficient of strain) of ±300 ppm/° C., thus providing good characteristic properties for the silicon film.

In the alternative method for forming poly-crystalline silicon films, an amorphous silicon film is formed at a temperature of up to 590° C. utilizing a plasma CVD method or a sputtering method, the amorphous silicon film is subjected to a crystallization process utilizing a laser annealing method, and then the resultant silicon film is subjected to a process such as photolithography to provide strain gages having an appropriate shape.

It is specifically noted that the thus provided strain gage is formed of substantially poly-crystalline silicon film having a relatively large grain size. It is also possible to reduce an amount of amorphous silicon left in the film to an excessively small amount.

However, the above-mentioned substantially poly-crystalline silicon film, which serves as the strain gage 32 in the strain detecting apparatus, has a grain size of about 0.1 μm, and is provided on its lower side with an amorphous interface-layer 33 coming into contact with the electrical insulating layer 31, as shown in FIG. 8. When a continuous measurement of strain was made in a relatively high temperature atmosphere (at least 100° C.) with the use of the strain detecting apparatus in which the above-mentioned substantially poly-crystalline silicon film is used as the strain gage, there observed a phenomenon (load characteristic at high temperature) in which the zero point for an output creeps as shown in FIG. 9. This occurs due to the fact that retarded elasticity of the amorphous interface-layer 33 causes the strain gage itself to creep in a stress applying direction (compression or tensile direction).

In addition, the laser annealing process has to be applied to each of sensing elements (i.e., the strain gages) to subject the above-mentioned amorphous interface-layer 33 to the crystallization process so as to provide the appropriate strain gages, thus being inconsistent with mass production. Further, the grain size of the silicon film exerts a significant influence on temperature characteristic of the strain gage. The silicon film, which has been subjected to the laser annealing process, has TCR (temperature coefficient of resistance) of about 2,000 ppm/° C. and TCS (temperature coefficient of strain) of −1,500 ppm/° C., thus being unsuitable for the strain detecting apparatus.

SUMMARY OF THE INVENTION

An object of the present invention, which was made to solve the exemplified problems as described above, is therefore to provide an apparatus for detecting an amount of strain, which enables improvement in load characteristic at a high temperature without deteriorating the temperature characteristic of a polycrystalline silicon layer formed on an electrical insulating layer, and a method for manufacturing such an apparatus.

In order to attain the aforementioned object, an apparatus of the first aspect of the present invention for detecting an amount of strain comprises:

a strain generating part to which strain is to be applied;

an electrical insulating layer formed on the strain generating part; and sensing elements formed on the electrical insulating layer, each of said sensing elements being made of a silicon film, said silicon film comprising a poly-crystalline main layer and a poly-crystalline interface-layer, which comes into contact with the electrical insulating layer.

According to the features of the present invention, it is possible to remarkably improve pressure load characteristic at a high temperature, without deteriorating temperature characteristic of the silicon film.

In the second aspect of the present invention, the above-mentioned silicon film may be subjected, after formation thereof, to an annealing process at a temperature of from 540° C. to 590° C.

Limiting the upper limit of the temperature of the annealing process to 590° C. makes it possible to apply this treatment as a precipitation hardening process as stated later, so as to improve the pressure load characteristic at a high temperature, without deteriorating temperature characteristic of the silicon film. On the other hand, limiting the lower limit of the temperature of the annealing process to 540° C. makes it possible to crystallize the interface-layer, which comes into contact with the electrical insulating layer in the form of amorphous structure, so as to obtain the required specific resistance, thus remarkably improving the pressure load characteristic at a high temperature.

In the third aspect of the present invention, the above-mentioned strain generating part may have a main body made of martensitic precipitation hardened stainless steel, which comprises from 3 to 5 wt. % Ni, from 15 to 17.5 wt. % Cr and from 3 to 5 wt. % Cu.

According to such a feature concerning a suitable material for the main body of the strain generating part, it is possible to impart a high elasticity and a high proof stress to the main body of the strain generating part.

In the fourth aspect of the present invention, the above-mentioned silicon film may contain an impurity as added in such a manner that specific resistance of the silicon film before said annealing process is within a range of from $7 \times 10^{-3}$ Ω·cm to $3.3 \times 10^{-2}$ Ω·cm and the specific resistance of the silicon film after said annealing process is within a range of from $3 \times 10^{-3}$ Ω·cm to $1.7 \times 10^{-2}$ Ω·cm.

According to such a feature, it is possible to keep TCR (temperature coefficient of resistance) of the silicon film serving as the strain gage within the range of from −300 ppm/° C. to +200 ppm/° C., thus providing an excellent temperature characteristic. The load characteristic at a high temperature of the strain detecting apparatus can also be improved remarkably.

In the fifth aspect of the present invention, the above-mentioned impurity may be boron.

In order to attain the aforementioned object, a method of the sixth aspect of the present invention for manufacturing an apparatus for detecting an amount of strain, comprises the steps of:
(a) preparing a strain generating part to which strain is to be applied,;
(b) forming an electrical insulating layer on said strain generating part;
(c) preparing material for a silicon film; and
(d) forming the silicon film on said electrical insulating layer, utilizing said material to provide sensing elements thereon, said silicon film comprising a polycrystalline main layer and an interface-layer, which comes into contact with the electrical insulating layer,
characterized in that:
    said step (a) is carried out, utilizing martensitic precipitation hardened stainless steel, which comprises from 3 to 5 wt. % Ni, from 15 to 17.5 wt. % Cr and from 3 to 5 wt. % Cu, to form a main body of said strain generating part;
    said step (c) comprises adding boron as an impurity to said material for the silicon film so that specific resistance of the silicon film is within a range of from $7 \times 10^{-3}$ Ω·cm to $3.3 \times 10^{-2}$ Ω·cm; and
    said method further comprises (e) subjecting, after said step (d), said silicon film to an annealing process at a temperature of from 540° C. to 590° C. so that the specific resistance of the silicon film is within a range of from $3 \times 10^{-3}$ Ω·cm to $1.7 \times 10^{-2}$ Ω·cm, thus crystallizing said interface-layer.

According to the features of the present invention, it is possible to manufacture the strain detecting apparatus, which permits to remarkably improve pressure load characteristic at a high temperature, without deteriorating temperature characteristic of the silicon film.

In the seventh aspect of the present invention, the above-mentioned step (e) may be carried out in plasma into which gas is introduced.

According to such a feature, it is possible to decrease the temperature of the annealing process and reduce a required period of time for the annealing process.

DETAILED DESCRIPTION OF THE PREFERRED EMBODIMENTS

Now, an embodiment of the strain detecting apparatus according to the present invention will be described in detail below with reference to FIGS. 1(a) to 5.

Figure 1A:
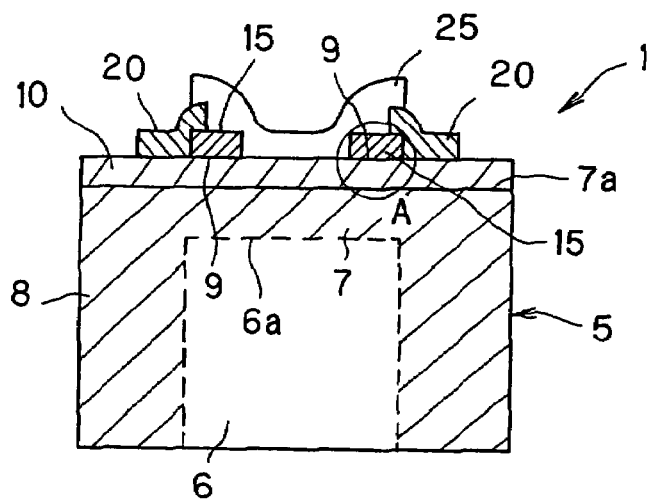
FIG. 1A is a cross-sectional view illustrating the strain detecting apparatus of he present invention.
Figure 1B:
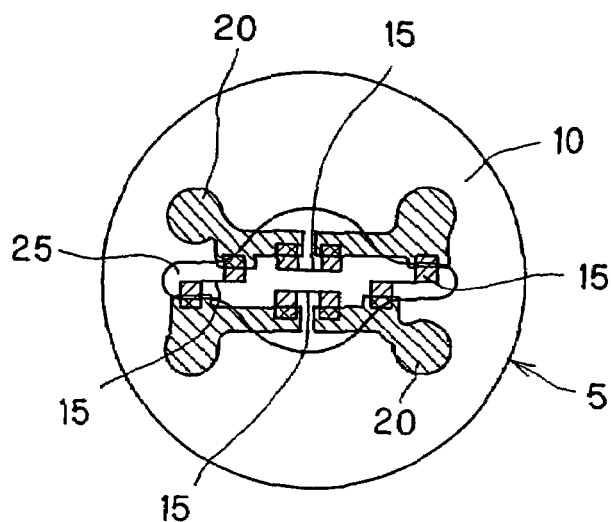
FIG. 1B is a plan view thereof.
Figure 2:
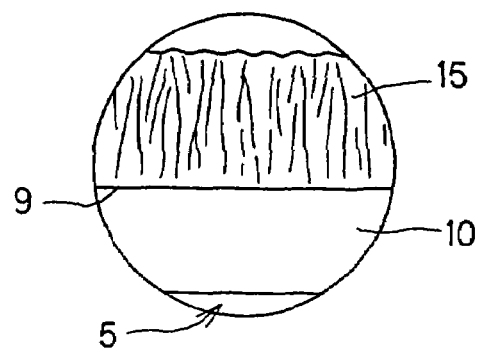
FIG. 2 is an enlarged view of the portion surrounded with a circle "A" as shown in FIG. 1A.

FIG. 1A is a cross-sectional view illustrating the strain detecting apparatus of he present invention and FIG. 1B is a plan view thereof, and FIG. 2 is an enlarged view of the portion surrounded with a circle "A" as shown in FIG. 1A. As shown in these figures, the strain detecting apparatus 1 includes a metallic diaphragm-main body 5 serving as a strain generating part, an electrical insulating layer (hereinafter referred to as the "insulating layer 10") formed on the metallic diaphragm-main body 5, strain gages 15, 15 formed on the surface of the insulating layer 10 so as to serve as the sensing element, electrode pads 20, 20 formed on the insulating layer 10 so as to come into contact with the strain gages 15, and a protecting film 25 formed on the strain gages 15 and the electrode pads 20 so as to cover substantially the entirety of each of the strain gages 15, on the one hand, and the portions of the electrode pads 20, on the other hand.

The metallic diaphragm-main body 5 is composed of a tubular portion 8 and a thin film portion 7 for closing the upper opening of the tubular portion 8 to define a cavity 6 therein. The metallic diaphragm-main body 5 is made of martensitic precipitation hardened stainless steel, which comprises from 3 to 5 wt. % Ni, from 15 to 17.5 wt. % Cr and from 3 to 5 wt. % Cu. The martensitic precipitation hardened stainless steel, which has an excellent elasticity and high proof stress, is a suitable material for the strain generating part. The martensitic precipitation hardened stainless steel is usually obtained by subjecting steel to a hot-rolling process, a solid solution treatment, and a precipitation hardening treatment, so as to provide a martensitic structure, which has a small amount of carbon, and in which copper-rich compounds are precipitated and hardened, thus imparting the high elasticity and the high proof stress to the steel.

Conditions for the solid solution treatment and the precipitation hardening treatment, which is to be carried out at the predetermined precipitation hardening temperature after completion of the solid solution treatment, are shown in Table 1.

TABLE 1

| Kind of Treatment | Symbol | Conditions |
|---|---|---|
| Solid solution treatment | S | Heating at 1020-1060° C. and then quenching |
| Precipitation hardening treatment | H900 | After Treatment "S", heating at 470-490° C. and air cooling |
| | H1025 | After Treatment "S", heating at 540-560° C. and air cooling |
| | H1075 | After Treatment "S", heating at 570-590° C. and air cooling |
| | H1150 | After Treatment "S", heating at 610-630° C. and air cooling |

Mechanical properties of materials, which have been subjected to the treatments according to the conditions as set forth in Table 1, are shown in Table 2.

TABLE 2

| Kind of Treatment | Symbol | Proof stress (N/mm²) (not less than) | Tensile strength (N/mm²) (not less than) | Elongation (%) (not less than) | Drawability (%) (not less than) | Hardness HBS or HBW (not less than) | Hardness HRC (not less than) |
|---|---|---|---|---|---|---|---|
| Solid solution treatment | S | — | — | — | — | 363 | 38 |
| Precipitation hardening treatment | H900 | 1175 | 1310 | 10 | 40 | 375 | 40 |
| | H1025 | 1000 | 1070 | 12 | 45 | 331 | 35 |
| | H1075 | 860 | 1000 | 13 | 45 | 302 | 31 |
| | H1150 | 725 | 930 | 16 | 50 | 277 | 28 |

It is recognized from the results as shown in Tables 1 and 2 that the temperature of the precipitation hardening treatment exerts influences on the mechanical properties of the material.

It is recognized from Tables 1 and 2 that application of the precipitation hardening treatment "H900" in which the treatment temperature is kept within the range of from 470° C. to 490° C., provides the maximum tensile strength of not less than 1310 N/mm². It is also recognized that application of the precipitation hardening treatment "H1075" in which the treatment temperature is kept within the range of from 570° C. to 590° C., even provides the tensile strength of not less than 1000 N/mm².

The inner surface of the thin film portion 7 of the diaphragm-main body 5 serves as a pressure-receiving surface 6a, which comes into contact with fluid such as gas or liquid having pressure to be measured. The diaphragm-main body 5 is fluid-tightly connected at the lower end of the tubular portion 8 thereof to a conduit or container for the fluid so that the fluid is introduced into the cavity 6 of the tubular portion 8.

The outer surface 7a of the thin film portion 7 (i.e., the upper surface of the diaphragm-main body 5), which extends to the outer periphery of the tubular portion 8 on the opposite side to the pressure-receiving surface 6a, is subjected to a mirror grinding.

The insulating layer 10 is formed on the above-mentioned outer surface 7a. The insulating layer 10 is formed for example of a silicon oxide film. The insulating layer 10 is formed utilizing a plasma CVD method or a sputtering method.

The strain gages 15 are formed on the insulating layer 10 in positions where compression stress and tensile stress are to be applied to the diaphragm-main body 5. There are provided for example four strain gages 15, i.e., two strain gages 15 provided in the positions to which the compression stress is to be applied, and the other two strain gages 15 provided in the positions to which the tensile stress is to be applied, as shown in FIG. 1B. In the present invention, the portion of the strain gage 15, which comes into contact with the insulating layer 10, is called the "interface-layer" 9.

The strain gage 15 is obtained by forming a crystalline silicon film containing boron as an impurity in thickness of about 0.5 μm, utilizing a plasma CVD method or a sputtering method, and then subjecting the thus formed silicon film to the annealing process at a temperature of from 540° C. to 590° C.

Figure 6:
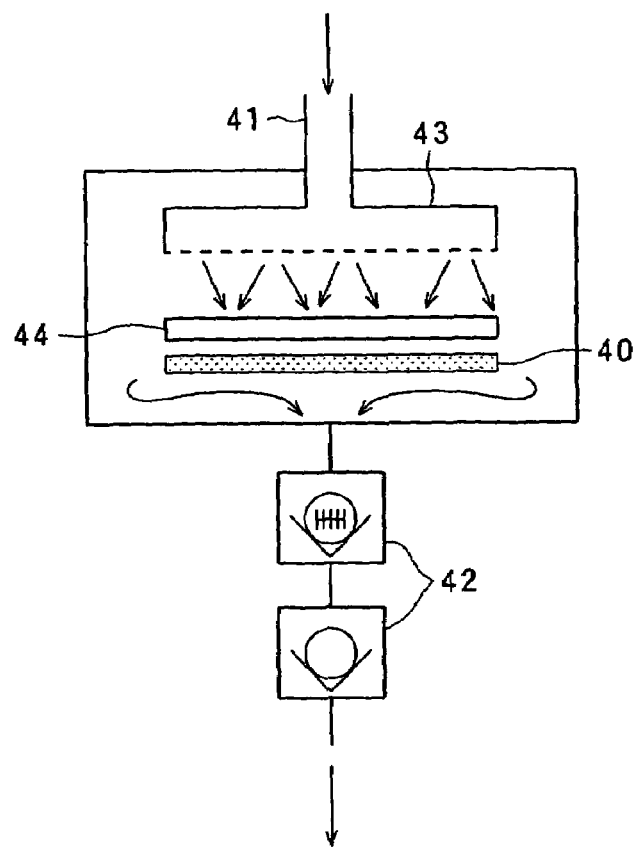
FIG. 6 is a schematic structural view illustrating an example of an annealing apparatus.
Figure 7:
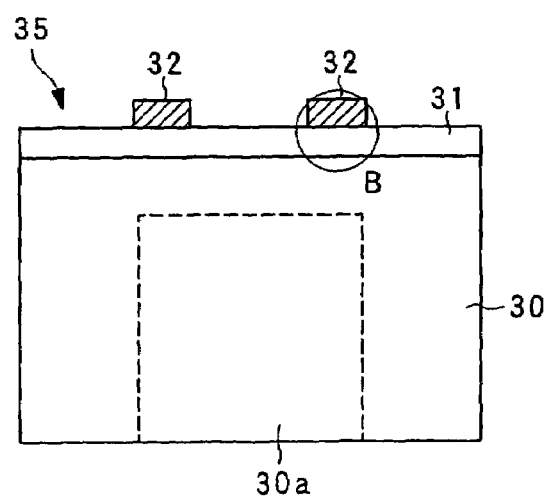
FIG. 7 is a schematic descriptive view illustrating the conventional strain detecting apparatus.
Figure 8:
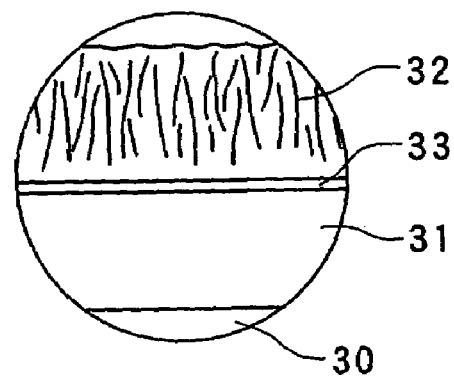
FIG. 8 is an enlarged view of the portion surrounded with a circle "B" as shown in FIG. 7.
Figure 9:
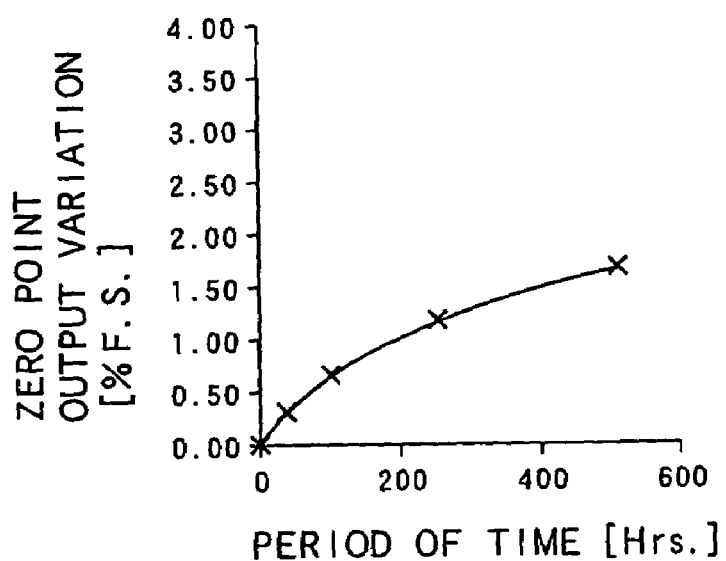
FIG. 9 is a graph illustrating pressure load characteristic at a high temperature of a strain gage of the conventional strain detecting apparatus, in conjunction with the relationship between the zero point output variation and a period of time.

FIG. 6 shows a schematic structure of an example of an annealing apparatus. The heating step as normally applied, which is included in the above-described precipitation hardening treatment, is applied as the annealing treatment. Alternatively, the annealing apparatus, which is provided with a heating system 40, a gas introducing system 41, a gas discharging system 42 and electrodes 43, as shown in FIG. 6, may be utilized to carry out the annealing process along with the gas introduction and utilization of plasma, while heating a substrate sheet 44 to a temperature within the range of from 540° C. to 590° C. Then, the resultant crystalline silicon film is subjected to a photolithography and a dry etching to form the strain gage 15.

The reason for limiting the upper limit of the annealing treatment temperature to 590° C. is that application of the treatment with the thus limited temperature to the precipitation hardening process as shown in Tables 1 and 2 can maintain characteristics of the high elasticity and the high proof stress of the metallic diaphragm-main body 5 (i.e., the main body of the strain generating part, which is made of martensitic precipitation hardened stainless steel, without deteriorating the temperature characteristics of the strain detecting apparatus, and can improve remarkably the pressure load characteristic at a high temperature. The reason for limiting the lower limit of the annealing treatment temperature to 540° C. is that application of the treatment at a temperature of less than 540° C. disables the interface-layer 9 of the silicon film, which comes into contact with the insulating layer 10, from being crystallized, thus leading to the existence of an amorphous portion. As a result, the required specific resistance cannot be obtained, thus making impossible to improve the pressure load characteristic at a high temperature. The lower limit of the annealing treatment temperature should therefore be limited to at least 540° C.

The crystalline silicon film includes boron as added as the impurity. The boron is added in such a manner that the specific resistance of the silicon film before the annealing process is within a range of from $7 \times 10^{-3}$ Ω·cm to $3.3 \times 10^{-2}$ Ω·cm. The specific resistance of the silicon film after the annealing process is within a range of from $3\times10^{-3}$ Ω·cm to $1.7\times10^{-2}$ Ω·cm.

Figure 3:
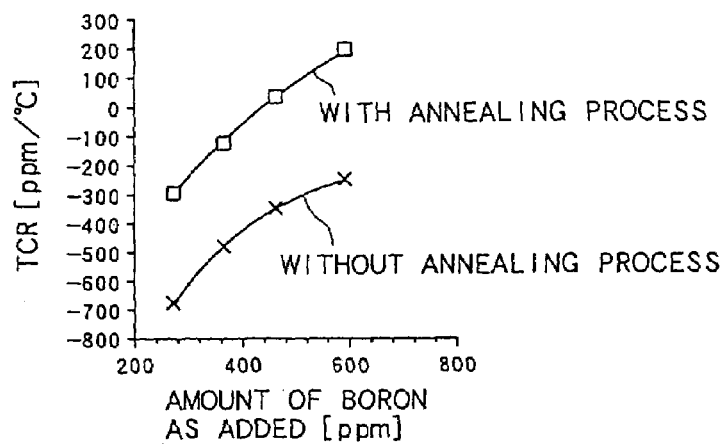
FIG. 3 is a graph illustrating the relationship between TCR characteristic and an added amount of impurity.

FIG. 3 shows TCR (temperature coefficient of resistance) characteristic relative to an added amount of impurity, of the strain gage serving as the sensing element of the detecting apparatus of the present invention. Addition of boron as the impurity enables the TCR of the strain gage to be kept within the range of from −700 ppm/° C. to −200 ppm/° C., as shown in FIG. 3. This makes it possible to attain the requirement that the TCR of the strain gage, which has been subjected to the annealing process, is kept within the range of from −300 ppm/° C. to +200 ppm/° C. Thus, the strain gage having the excellent temperature characteristic can be obtained.

Figure 4:
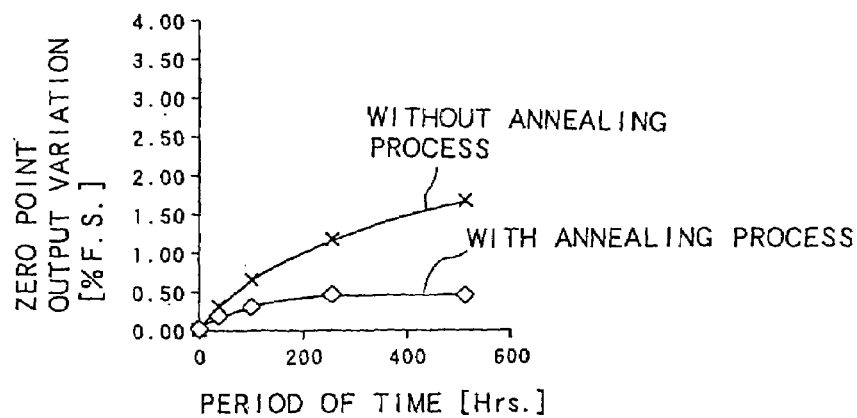
FIG. 4 is a graph illustrating pressure load characteristic at a high temperature of a strain gage of the strain detecting apparatus, in conjunction with the relationship between the zero point output variation and a period of time.

FIG. 4 shows the pressure load characteristic at a high temperature of the strain detecting apparatus of the present invention, to which thermal energy of 140° C. and pressure of 180 MPa are applied. Subjecting the silicon film, which has had the specific resistance of from $7\times10^{-3}$ Ω·cm to $3.3\times10^{-2}$ Ω·cm before the annealing process, to the annealing process at the temperature of from 540° C. to 590° C. enables the pressure load characteristic at a high temperature of the strain detecting apparatus to be decreased by up to 50 percent, in comparison with the apparatus, which has not been subjected to the annealing process, as shown in FIG. 4.

Figure 5:
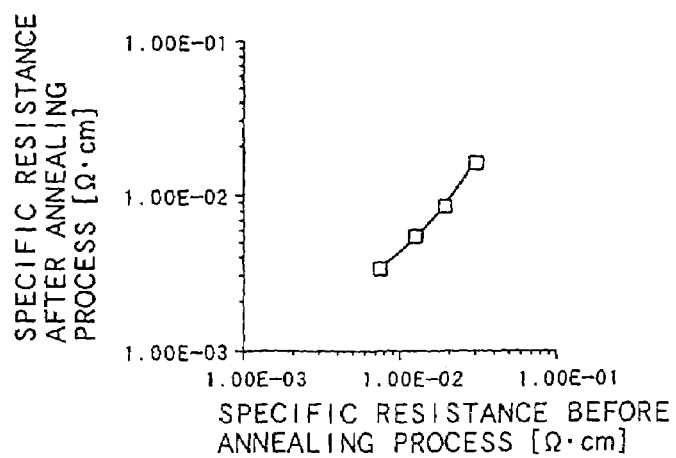
FIG. 5 is a graph illustrating specific resistance characteristic of the silicon film before and after the annealing process.

FIG. 5 shows the specific resistance characteristic of the silicon film before and after the annealing process. It is presumed that application of the annealing process can improve crystallinity of the poly-crystalline silicon film, thus occurring reduction of the specific resistance, as shown in FIG. 5.

The above-described annealing process enables the interface-layer 9 of the silicon film (i.e., the strain gage 15), which comes into contact with the insulating layer 10, to be poly-crystallized without existence of an amorphous portion, as shown in FIG. 2. The crystalline silicon film is the poly-crystalline body in which the crystals grow in the form of columnar structure in the perpendicular direction to the surface of the insulating layer 10.

The electrode pad 20 is provided so as to come into contact with the insulating layer 10 and the strain gages 15, which are formed in the positions where the compression stress and tensile stress are to be applied. In addition, wiring for the strain gages 15 is carried out to form a full bridge circuit so as to output voltage in accordance with variation of strain. The wires and the electrode pads 20 are formed of metallic thin film (such as an aluminum or gold film), utilizing a vacuum evaporation or a sputtering method.

The protecting film 25 is provided to protect the contact portions of the strain gage 15 with the electrode pad 20.

The present invention is not limited only to the above-described embodiment, and may be worked in the form of various kinds of embodiments. The full bridge circuit having the four strain gages is not necessarily used in the wiring for the strain detecting apparatus described in the embodiment, and there may be used a half bridge circuit utilizing two strain gages or a Wheatstone bridge circuit utilizing the single strain gage.

The entire disclosure of Japanese Patent Application No. 2002-287881 filed on Sep. 30, 2002 including the specification, claims, drawings and summary is incorporated herein by reference in its entirety.

What is claimed is:

1. A method for manufacturing an apparatus for detecting an amount of strain, comprising the steps of:
   (a) preparing a strain application member to which strain is to be applied;
   (b) forming an electrical insulating layer on said strain application member;
   (c) preparing material for a silicon film; and
   (d) forming the silicon film on said electrical insulating layer, utilizing said material to provide sensing elements thereon, said silicon film comprising a polycrystalline main layer and an interface-layer that comes into contact with the electrical insulating layer, wherein:

said step (a) is carried out, utilizing martensitic precipitation hardened stainless steel, which comprises from 3 to 5 wt. % Ni, from 15 to 17.5 wt. % Cr and from 3 to 5 wt. % Cu, to form a main body of said strain application member;

said method further comprises (e) subjecting, after said step (d), said silicon film to an annealing process at a temperature of from 540° C. to 590° C., thus crystallizing said interface-layer.

2. The method of claim 1, wherein:

said step (c) comprises adding boron as an impurity to said material for the silicon film so that specific resistance of the silicon film is within a range of from $7\times10^{-3}$ Ω·cm to $3.3\times10^{-2}$ Ω·cm.

3. The method of claim 1, wherein:

said step (e) is carried out in plasma into which gas is introduced.

* * * * *